(No Model.)
T. B. FOGARTY.
2 Sheets—Sheet 2.
PROCESS OF AND APPARATUS FOR MANUFACTURING GAS.
No. 265,792.
Patented Oct. 10, 1882.
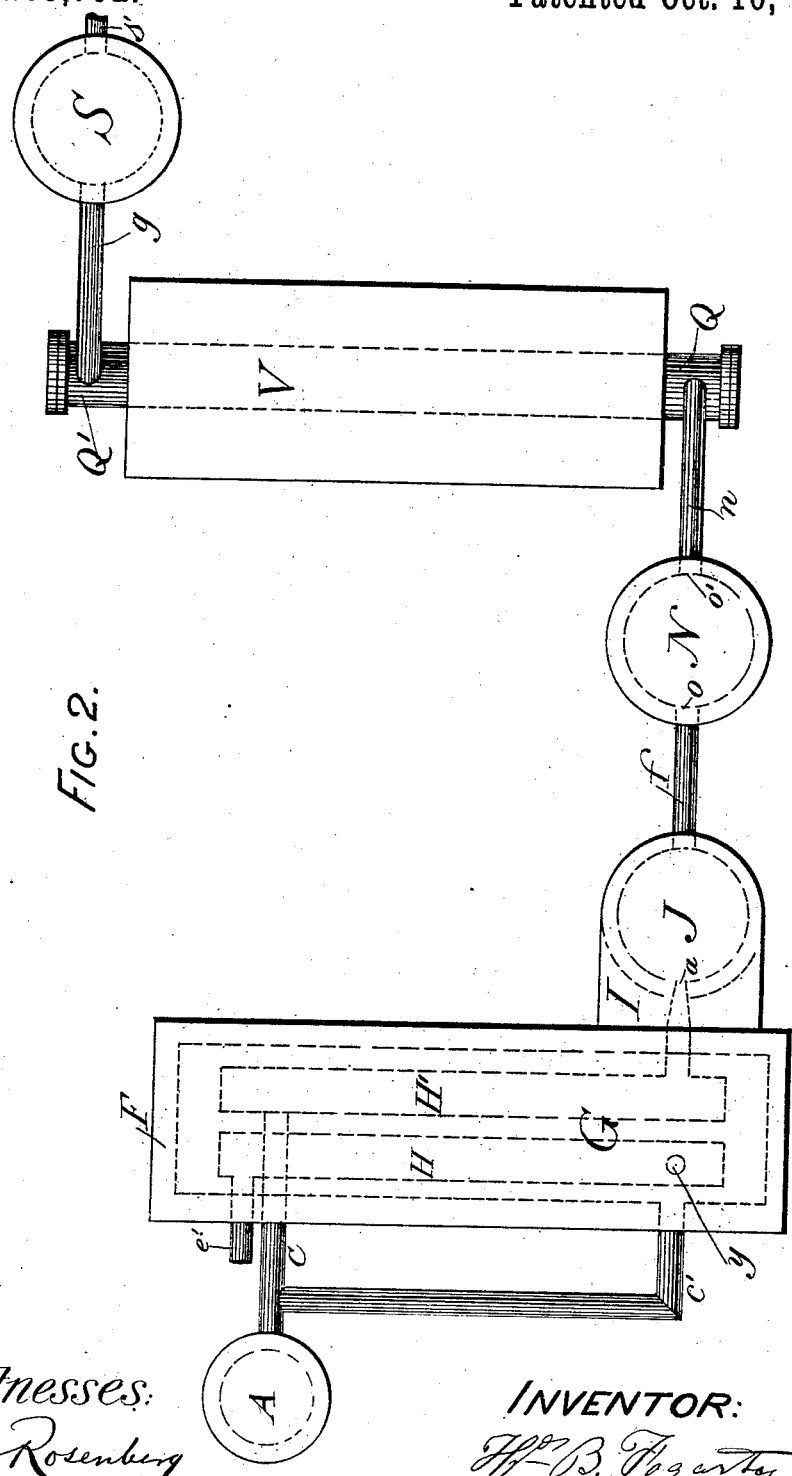

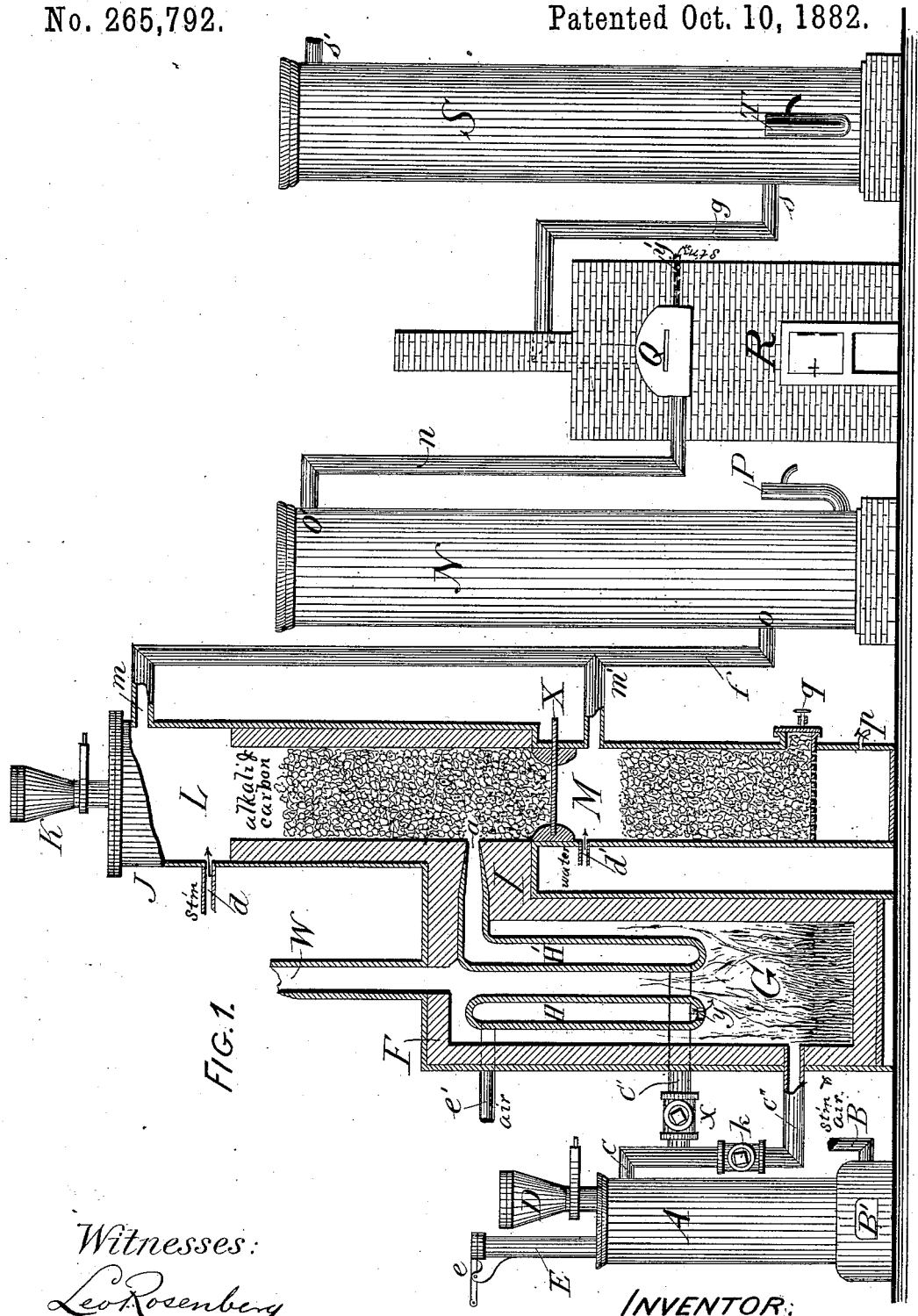

UNITED STATES PATENT OFFICE.

THOMAS B. FOGARTY, OF BROOKLYN, NEW YORK.

PROCESS OF AND APPARATUS FOR MANUFACTURING GAS.

SPECIFICATION forming part of Letters Patent No. 265,792, dated October 10, 1882.

Application filed March 14, 1882. (No model.)

*To all whom it may concern:*

Be it known that I, THOMAS B. FOGARTY, of the city of Brooklyn, county of Kings, and State of New York, have invented a certain new and useful Process of and Apparatus for Manufacturing Gas; and I hereby declare the following to be a full, clear, and exact specification of the same, reference being had to the accompanying drawings, forming part of this specification.

My invention relates to the manufacture of water-gas through the decomposition of steam and air by incandescent carbon generally, but more particularly to those processes of making water-gas wherein steam and air are decomposed by incandescent carbon, and the resulting gaseous mixture is freed from nitrogen and carbonic oxide by converting the former into cyanogen or some of its compounds or derivatives, and the latter into a carbonic acid, the last-named impurity being itself removed from the gas by means of ammonia.

I shall now proceed to describe my invention so fully and clearly that any person skilled in the art of making water-gas may be able to understand and practice the same; and for this purpose I shall divide or classify it into or under four parts or heads, consisting, first, in the manufacture of a cheap heating-gas chiefly consisting in nitrogen, hydrogen, carbonic oxide, and carbonic acid; second, in an improved process of and apparatus for converting the nitrogen in the crude heating-gas into cyanogen or some compound or derivative thereof; third, in the conversion of the carbonic oxide in the crude heating-gas, as well as that produced in the second part of my process, into carbonic acid by means of steam; fourth, in the purification of the gas from carbonic acid by means of ammonia.

Be it here understood that by the term "water-gas" I mean any gas produced through the decomposition of steam by incandescent carbon, and capable of being applied to the purposes of light and heat, or of either of them.

Be it also understood that when I speak of the removal of any impurity from the gas or of the decomposition, combination, or conversion of any of the substances or compounds contained therein or added thereto for the purposes of this invention I speak only in a practical and limited sense, and not as referring to the absolute purification and conversion, which, it is well known, cannot be attained in practice.

I shall now proceed to describe in detail the several parts of my invention, their connection with each other and with the other parts of my invention not heretofore specified, and the manner of their combination to form a perfect and continuous process.

In carrying out the first part of my invention I force steam and air over or through a mass of incandescent carbon—such as coal, coke, or charcoal—contained in a close cupola, furnace, or retort of any suitable form or construction, and cause such incandescent carbon to decompose said steam and air, and to combine with the oxygen thereof, giving rise to carbonic oxide and carbonic acid, the hydrogen of the steam and the nitrogen of the air being at the same time set free, and the whole forming what is known as a "heating" or "generator" gas, consisting chiefly of nitrogen, hydrogen, carbonic oxide, and carbonic acid. I call this cupola my "generator-furnace" and the gas produced by it "generator-gas."

In carrying out the second part of my invention I construct a cupola or furnace of any suitable form, but preferably as a vertical cylinder or cupola, divided horizontally into two chambers, upper and lower, by means of a suitable valve or other device answering the same purpose. I call this my "alkali-furnace," and I distinguish its two chambers, the upper as the "cyanidizing" and the lower as the "ammonia" chamber, respectively. As far as possible I make my alkali-furnace gas-tight, and I construct it of any suitable material capable of standing intense heat, and with walls of thickness sufficient to prevent material loss of heat by radiation. The lower or ammonia chamber I construct of such form and dimensions as may be found most suitable for the performance of the functions for which it is designed; but I prefer to make it a straight vertical cylinder of a diameter corresponding to that of the interior of the upper or cyanidizing chamber, and without lining, so as to be capable of being rapidly cooled.

At a suitable height above the bottom of my cyanidizing-chamber I provide it with one or more suitable tuyeres, and connect such tuyere or tuyeres with a flue of fire-brick or other refractory material, and of thickness sufficient to prevent loss of heat by radiation. I also provide my cyanidizing-chamber with a double hopper or other device suitable for supplying material to it. I provide it, too, with a suitable gas-outlet and a suitably-connected steam-pipe, and, if found necessary for the examination of its interior, with suitable sight-holes.

I furnish my lower or ammonia chamber with a suitable gas-outlet near the top thereof, and at its bottom with a door suitable for emptying the chamber, such door to be constructed so as to be readily opened and closed, and to be, moreover, capable of being made gas-tight. I also furnish my ammonia-chamber with a suitably-connected water-pipe, and at a suitable distance from the bottom of said chamber I place a perforated plate or a set of grate-bars to serve as a false bottom that may support the mass of alkalized fuel in the chamber, and at the same time permit liquids to pass through it into a space beneath. The door just spoken of should be placed immediately above this false bottom.

Between my generator and alkali furnace I construct what I call my "superheater," which I can best describe as the combination of a combustion-chamber with superheating retorts or flues, wherein generator-gas and air are separately superheated and raised to elevated temperatures by the intense combustion of generator-gas and superheated air in the combustion-chamber itself.

Having suitably connected my superheater with my generator-furnace upon one side and with my alkali-furnace upon the other, and having also closed the valve between the cyanidizing and ammonia chambers of the latter, I now proceed to charge the cyanidizing-chamber with coal, coke, charcoal, or some other suitable form of carbon suitably mixed, compounded, or combined with alkali of some sort, or with some suitable mixture, compound, or combination of an alkali, preferably the carbonate of an alkali which parts readily with its acid. I now introduce a regulated quantity of my generator-gas into the combustion-chamber of the superheater, wherein it mixes with a volume of air which has been raised to a high state of incandescence in passing through one or more of the highly-heated retorts or flues of the superheater, whereupon the air and gas enter into intense combustion, whereby the superheater itself is raised to and maintained at an intense heat. I next introduce another volume, preferably regulated, of my generator-gas into the superheater, and therein cause it to pass through one or more highly-heated retorts or chambers, wherein it becomes intensely heated, and whence it passes into the cyanidizing-chamber through the flue and tuyere already described.

To any person familiar with the theory and practice of generator-furnaces it must be evident that my generator-gas, being itself the product of partial combustion, owing to a deficient supply of oxygen in the generator-furnace, and having been, moreover, freed from the undecomposed steam that accompanied it through the decomposition of such steam by the carbonic oxide of the generator-gas itself in the incandescent flues or retorts of the superheater, must be practically free from oxygen, and consequently incapable of entering into combustion with combustible gases or solids either pre-existing or generated in the combustion-chamber. The great importance of the freedom of the generator-gas entering the cyanidizing-chamber from oxygen must be apparent when it is known that cyanogen is a highly-combustible gas, and that the presence of oxygen in any considerable quantity in the cyanidizing-chamber would be highly destructive of it, and indeed almost fatal to its production.

My generator-gas, at the same time that it is incapable of exercising an appreciably injurious effect upon the gaseous or solid matter of the cyanidizing chamber, has the faculty of imparting by contact its own high temperature to the alkalized carbon contained therein, and quickly raises it to an intense heat at the same time that it furnishes to it in a highly-incandescent state an equivalent of nitrogen wherewith it may combine to form cyanides and cyanates of the alkali used, as it immediately does. The gaseous products of the cyanidizing-chamber, consisting of generator-gas practically free from nitrogen, mixed with cyanogen or gaseous compounds or vapors thereof, or of the alkali used in the process, now ascends to the upper part of the cyanidizing-chamber, which is not entirely filled with alkalized carbon, but contains above the latter a large space of such height and so constructed that the upper part thereof will be sufficiently removed from the influence of the heat to maintain a temperature capable of promoting mutual decomposition and transposition of elements between the cyanidized productions of the chamber and an equivalent of steam, which is admitted preferably in excess to the top of the cyanidizing-chamber, and at the temperature found most favorable to such decomposition and transposition of elements, the products whereof will be oxides of carbon and ammonia, which will escape from the cyanidizing-chamber through a pipe or other suitable conduit, and thence to a suitably-constructed condenser or scrubber, or other cooling apparatus, in passing through which they become thoroughly mixed and broken up, and being, moreover, brought into frequent contact with cool wet surfaces have their temperature reduced sufficiently to admit of the combination of ammonia and carbonic acid, which always takes place with the production of carbonates of ammonia when these gases are brought together at low temperatures and in the presence of moisture, such combination being further promoted by contact with the cool moist surfaces of the obstructions wherewith the scrubber is filled, and whereby the gas is broken up and cooled in passing through the scrubber. When the alkalized carbon in the cyanidizing-chamber has been submitted to the action of the incandescent nitrogen of the generator-gas for a sufficient time I open the valve between it and the ammonia-chamber beneath, and permit the alkalized carbon, now strongly impregnated with alkaline cyanides and cyanates to fall from the upper into the lower chamber, into the upper part of which I suitably inject a little water, preferably in a finely-divided state, and this, falling on the upper surface of the incandescent cyanidized mass in the chamber, cools it gradually, from the top downward, and as it does so simultaneously decomposes the cyanides and cyanates present, being at the same time itself decomposed by them, and, a mutual transposition of elements taking place, the hydrogen of the water and the nitrogen of the cyanidized alkali uniting to form ammonia, while the oxygen of the water and the carbon of the cyanogen combine to form carbonic oxide and carbonic acid, the alkali being set free or entering into fresh combinations.

The gaseous products of the above double decomposition escape through a suitable outlet, placed at or near the top of the chamber, and thence through a suitably-connected pipe into a suitable scrubber or condenser, wherein the ammonia and carbonic acid present combine to form carbonates of ammonia, as already described, the remaining gaseous products joining and mingling with the other combustible gases. The ammoniacal compounds produced in the scrubbing process are very soluble, and will be dissolved in the water passing through the scrubber.

When I find upon examination that ammonia practically ceases to be evolved from the crude alkaline mass in the ammonia-chamber I remove it through the door above the perforated grate or bottom, and, having dried it in any convenient manner, but preferably by the waste heat of the superheater, I use it over again as before, adding, when needed, a little alkali to compensate for waste in the process.

I shall now describe the third part of my invention, which relates to the further purification of the gas by the conversion of its carbonic oxide into carbonic acid, with the liberation of a volume of hydrogen equal to that of the carbonic oxide removed. My gaseous products being freed from ammonia, and consisting chiefly of hydrogen, carbonic oxide, carbonic acid, and such nitrogen as may have escaped combination and conversion, are now caused to pass through one or more highly-heated retorts or superheaters, in which they are brought into intimate contact with steam, when, the entire volume being brought to a high state of incandescence, the steam is decomposed by the carbon of the carbonic oxide, giving rise to a volume of carbonic acid equal to that of the decomposed oxide, and at the same time setting an equal volume of hydrogen free.

The fourth part of my invention relates to the purification of the gas from carbonic acid and sulphureted hydrogen. For the purpose of purifying my gas from carbonic acid and sulphureted hydrogen I avail myself of the great quantity of ammonia resulting from the conversion thereinto of the nitrogen of the gas, as described in that part of this specification which relates to the second part of my invention, and by means of scrubbers or other suitable apparatus, and under suitable conditions of moisture and temperature, I bring it (the ammonia) into intimate contact with the carbonic acid and sulphureted hydrogen of the gas, and cause it to combine therewith and to form commercial salts, which may be readily separated and collected. Whenever the ammonia in the gas is insufficient in quantity for its purification from the contained carbonic acid and sulphureted hydrogen at one operation I recover or regenerate it by any of the well-known processes, and so am able to use it over and over again for the removal of additional volumes of these impurities until they are entirely removed from the gas.

In the drawings, Figure 1 is a view, partly section and partly elevation, of my improved apparatus. Fig. 2 is a plan of the same.

A is a cupola or furnace, suitably provided with an air and steam inlet, B, a gas-outlet, C, a hopper, D, a chimney, E, and a chimney valve or cover, $e$.

F is a superheater, suitably provided with a combustion-chamber, G, and retorts or flues H and H', suitably arranged in a superheater, F, and connected to a furnace or cupola, A, by pipes $c'$ and $c''$.

J is an alkali-furnace, suitably provided with the hopper K, steam-pipe $d$ and water-pipe $d'$, and outlets $m$ and $m'$, having the cyanidizing-chamber L and the ammonia-chamber M, separated by a suitable valve, X, and an outlet suitably connected by a pipe, $f$, to the inlet of a scrubber, N.

N is a scrubber, having its inlet O, outlet O', and overflow P, and connected by the pipe $n$ to the inlet Q of a retort, V, set in a suitable furnace, R.

R is a furnace containing a retort, V, suitably connected at its outlet Q' by a pipe, $g$, to a scrubber, S.

S is a suitably-constructed scrubber, connected at its inlet $s$ by a pipe, $g$, to a retort, V, and at its outlet $s'$ to a gas-holder or suitable intervening apparatus.

The mode of operation is as follows: I open the door B' and chimney-valve $e$ of the cupola A, and having filled the cupola to a suitable depth with coal, coke, charcoal, or any other suitable form of carbon, I ignite it and allow it to burn until it becomes incandescent, at least to a considerable extent. I now, by means of a suitable jet, pump, or aspirator, force suitably-adjusted volumes of steam and air into the ash-pit of the cupola through the pipe B, suitably connected thereto. As soon as the mingled stream of steam and air meets the incandescent fuel in the cupola the steam becomes decomposed with a slight explosion, and flames issue from the furnace-door B', which may now be closed. The mingled stream of air and steam is now forced upward through the mass of incandescent fuel in the cupola, through the open chimney of which it escapes as a generator-gas, the hydrogen and nitrogen of the steam and air passing on unchanged, while their oxygen combines with the carbon of the coal or other fuel to form carbonic oxide and carbonic acid in proportions which vary according to the relative volumes of steam and air, the temperature of the furnace, and the greater or less depth of the contained incandescent fuel. The generator-gas also contains some sulphurous impurities and a large volume of undecomposed steam.

For the purposes of my invention it is desirable that my generator-gas should contain as much carbonic oxide and as little carbonic acid as possible, and for this reason it is advisable to keep the body of fuel in the cupola of such a depth that all or nearly all of the carbonic acid produced in the lower part of the fire may be decomposed and converted into carbonic oxide by the incandescent fuel in the upper part of the cupola, as happens when carbonic acid is passed through incandescent carbon, and as, indeed, is the usual practice in the manufacture of water-gas. The production of generator-gas in the cupola will now be uniform and continuous, if care be taken to replenish and clean the fire at proper intervals. Its quality, too, will be pretty constant and uniform, if the relative proportions of air and steam are suitably adjusted.

In order to avoid danger of back-pressure from the gas-holder or from any other source, I find it advisable to nearly close the chimney-valve e, and thus create a counter-pressure in the cupola, before opening either of the valves x and k on the pipes c' and c''.

As it is desirable to heat the superheater F to an extremely high temperature, I find it advantageous to heat it by means of generator-gas, which I accordingly admit to the combustion-chamber by opening the cock k on the pipe c'', taking care to light the gas immediately upon its entering the chamber, so as to avoid explosion.

When a fan or blower is used to supply air to the ignited gas in the combustion-chamber the door (not shown in the drawings) through which the gas has been lighted may be closed immediately; but when the natural draft in the chimney W is relied upon to support combustion it is advisable not to close this door until the chimney becomes heated, when it should be closed gradually. In either case the air to support the combustion of the ignited gas in the chamber G is drawn or forced through the pipe e', and, passing through the flue or retort H, enters the combustion-chamber at y, and, as the flue becomes hotter, is itself more highly heated in passing through it. At the same time the intensity of the combustion in the chamber G increases in the same ratio, until finally the flue H having gradually attained an intense heat the temperature of the air passing through it and the intensity of the combustion in the chamber G increase in the same ratio, and thus mutual reactions between the superheated air in the flue and the intensity of combustion in the chamber continue until an exceedingly high temperature is attained. The superheater having attained a good working heat, I now proceed to charge my alkali-furnace J, which I do as follows: I first close the valve X between the chambers L and M, and through the hopper K, I introduce into the cyanogen-chamber L a suitable quantity of coal, coke, charcoal, or some other suitable form of carbon suitably mixed, compounded, or combined with an alkali or some suitable form, compound, or combination of an alkali;
and opening the cock x on the pipe c', I allow a suitably-regulated volume of generator-gas to pass through the flue or retort H', wherein it is raised to a state of intense incandescence, and at the same time has the undecomposed steam which accompanies it decomposed by the carbonic oxide which it contains with the production of carbonic acid and free hydrogen. In this condition the generator-gas enters the cyanidizing-chamber L, and, passing through the mass of alkalized carbon contained therein, gradually raises it to its own state of intense incandescence. As soon as this occurs steam is admitted to L through the pipe d. The generator-gas admitted to the chamber L having been deprived of its oxygen in the generator-furnace, and its accompanying steam having been decomposed by the carbonic oxide of the gas itself in passing through the flue or retort H', is incapable, at least to any extent, of oxidizing either the carbon in the chamber L or the combustible gases produced therein. Under the influence of the intense temperature the carbon and alkali, however, continue with the nitrogen of the gas to form cyanogen and compounds thereof, principally cyanides and cyanates of the alkali used, some sulphocyanogen being also produced from the combination of the sulphurous impurities of the gas with cyanogen. Some of the cyanogen products thus formed being gaseous and others solid, consequently the economical working of the process renders it imperative that provision should be made for obtaining and utilizing both classes of products.
For the purpose of preserving and converting into ammonia free cyanogen and such of its compounds as escape from the mass of alkalized carbon in a gaseous state I admit a regulated volume of steam, preferably in excess of the combining equivalent of the cyanogen, at a suitable temperature, to the chamber L, where it mixes with the cyanidized gaseous products escaping from the mass of alkalized carbon, and decomposes them with the production of hydrogen, oxides of carbon, and ammonia. As the success of the process is nearly, if not altogether, dependent upon the maintenance in the upper part of the cyanidizing-chamber of a suitable temperature, I am careful that the size of the upper or decomposing part of the chamber, its proximity to or remoteness from the incandescent mass of alkalized carbon in the lower part of the chamber, and the temperature of the steam admitted through the pipe $d$, and also its volume, are suitably adjusted to the requirements of the process. The greater part of the cyanidized products formed in the cyanidizing-chamber is formed in the mass of incandescent cyanidized carbon remaining in the chamber, and I now proceed to utilize these also by converting them into ammonia and other salable products. I permit the alkalized carbon to remain in the cyanidizing-chamber as long as I consider necessary for the cyanidizing of the alkali, generally about three hours, more or less, when I open the valve X between L and M, and allow the cyanidized mass to fall into the lower or ammonia chamber, and then, having closed the valve between the two chambers, and charged the upper one afresh with alkalized carbon by means of the hopper K, I proceed as before. It must be evident that the operation of cyanidizing the alkalized carbon may be made intermittent or continuous at will, according as the chamber L is wholly or partially emptied and charged at stated intervals. By means of the pipe $d'$, I now throw a suitably-regulated spray of water upon the incandescent mass of cyanidized carbon in the chamber M. At first some of the water is decomposed by the incandescent carbon; but this effect ceases almost immediately, the gases produced being carbonic oxide, carbonic acid, and hydrogen, with a little ammonia. As soon, however, as the surface of the mass of cyanidized carbon becomes cooled to a point at which it is no longer capable of decomposing the water, or rather the steam produced by it, the hot steam immediately lays hold of and decomposes the cyanides and cyanates present in the upper strata of carbon, which are now at a temperature just suited to the production of ammonia, and is itself in turn decomposed by the cyanides and cyanates, the hydrogen of the steam combining with the nitrogen of the cyanidized alkali to form ammonia, while its oxygen unites with the carbon of the cyanogen to produce carbonic oxide and carbonic acid, principally the latter, the alkali being set free or entering into fresh combinations.

It will be readily perceived that in the above process of converting the cyanidized products of the incandescent alkalized mass into ammonia the cooling process proceeds from the top downward through the mass, which, if the operation be carefully conducted, will be cooled at top so low as to be incapable even of producing steam, while its center may be at a temperature suitable for the production of ammonia, and the bottom of the mass may still be in a highly-incandescent state and fully capable of decomposing and producing thereby combustible gases. A self-evident advantage of this process of converting the cyanidized alkali into ammonia is that as the ammoniacal gas escapes it passes through the upper strata of the mass, which are always at a temperature much lower than that at which it has been produced, and consequently are incapable of decomposing or injuring it.

It must be also perceived that by continuing the ammonia producing and cooling process just described the mass of alkalized carbon in the chamber M becomes gradually cooled throughout to such an extent that it is no longer capable even of producing steam. When this occurs the water thrown upon it filters through the mass and passes off at the cock $p$, which thus furnishes an excellent indication of the termination of the production of ammonia. The man in charge soon learns also to discover by opening a cock placed at any convenient point upon the outlet from the ammonia-chamber whether ammonia is passing through it or not. The charge, having been worked off sufficiently, must now be removed through the door $q$ and dried thoroughly in any convenient manner, when it will be ready to be returned to the cyanidizing-chamber for the production of a fresh equivalent of cyanidized alkali. Before returning the spent mass to the cyanidizing-chamber it is often necessary to add a little fresh alkali to compensate for waste in the process. When the alkalized carbon withdrawn from the ammonia-retort appears to be so far exhausted as to be unfit for further use I throw it into a solution of a salt of iron and produce a ferrocyanide of the alkali used. The generator-gas, having been deprived of its nitrogen in passing through the incandescent alkalized carbon in the cyanidizing-chamber, and consisting principally of hydrogen, carbonic oxide, carbonic acid, and free ammonia, escapes from the chamber L through its outlet $m$, and, passing through the pipe $f$, meets the ammoniacal gas produced in M at $m'$, and accompanied by and mixed with it enters at O into the scrubber N, through which it passes slowly, and in which it is continually broken up by and brought into contact with the cool wet surfaces of coke, brush, slats, or other obstructions with which the scrubber is filled, and over and through which water or other liquid is caused to trickle slowly. The consequence of this scrubbing process is that the gas attains a low temperature, and the ammonia, taking up its equivalent of carbonic acid, combines therewith to form carbonates of ammonia, which are immediately dissolved by the liquid passing through the scrubber being carried off with it through the overflow P.

When the carbonic acid is in excess, as it is desirable it should be, of the quantity required for the production of monocarbonate of ammonia, such excess enters into combination with and converts into bicarbonate its equivalent of the monocarbonate. The gas thus freed from nitrogen, ammonia, and carbonic acid now escapes from the scrubber N through its outlet O', and, passing through the pipe $n$, enters the retort V at Q, where it meets with a volume of steam, preferably superheated, supplied from any suitable source by the pipe $y'$. This steam now mixes with the gas, and the combined volume being raised to a state of intense incandescence in passing through the retort the steam becomes decomposed by the carbonic oxide of the gas, its oxygen combining therewith and converting it into carbonic acid, and its hydrogen being set free and going to swell the volume of the combustible gases. The gas now requires to be again purified from carbonic acid, and this I effect, as before, by causing it to pass from the retort V through a pipe, $g$, into a scrubber, S, which it enters at $s$, and in which it meets, as before, with a volume of ammonia, which has meanwhile been regenerated or recovered, and has been caused to enter the scrubber through a suitable connection. (Not shown in the drawings.) The gas now passes slowly upward through the scrubber in company with the ammonia, and both gases being thoroughly mixed and broken up, as before, and being, moreover, subjected to cooling influences and to the contact of wet surfaces, the ammonia again takes up its equivalent of carbonic acid, the resulting carbonates being dissolved in liquid, which is caused to trickle slowly through the scrubber, and passing off with it through the overflow of the scrubber, as before. The gas may yet require to be freed from sulphurous and other impurities incapable of being removed by ammonia, but this having been effected by submitting the gas to the ordinary iron or lime or other suitable process of purification, it is now in a proper condition for use as a heating agent for either domestic or manufacturing purposes. However, it still requires to be suitably carbureted or enriched with hydrocarbon gases or vapors before it becomes capable of being used for the ordinary purposes of illumination. As, however, there are various well-known processes for effecting this, and as, moreover, they have no connection with my invention except incidentally, it is unnecessary to do more than allude to them here.

I do not bind or confine myself to the exact processes, or succession of processes, or to the exact form of apparatus described, for it is very evident that in a continuous and extended process like my invention the several processes and details and the exact order and succession of the same, as well as the form, construction, and arrangement of the apparatus used, may be varied indefinitely.

I hereby disclaim as a part of this invention the process of producing gas, consisting in, first, producing carbonic oxide and hydrogen in a generator-furnace; second, burning the gas so produced in a combustion-chamber; third, passing the incandescent products of such combustion through carbon and alkali, causing the nitrogen in said products of combustion to combine with said carbon and alkali, producing ammonia, and removing such ammonia, substantially as described in my application for a patent filed March 29, 1882.

What I claim, and desire to secure by Letters Patent, is—

1. In the manufacture of water-gas, the process of, first, generating the crude gas through the decomposition of air and steam by incandescent carbon; second, removing the undecomposed steam from the crude gas by subjecting the mixture to a high degree of heat; third, converting the nitrogen of the crude gas into ammonia and removing the ammonia, substantially as described.

2. In the manufacture of water-gas, the process of, first, generating the crude gas through the decomposition of air and steam by incandescent carbon; second, removing the undecomposed steam from the crude gas by causing it to be decomposed by the carbonic oxide of the gas itself by raising it to incandesence; third, converting the nitrogen of the crude gas into ammonia and removing the same by subjecting the gaseous mixture to the action of water; fourth, converting the carbonic oxide in the gas into carbonic acid by subjecting the gas, together with steam, to a high or incandescent temperature, producing carbonic acid and free hydrogen, substantially as described.

3. In the manufacture of ammonia and hydrogen gas, the process of heating the mass of carbon and alkali (used in extracting nitrogen from the crude gas) and producing cyanides, which consists in superheating the crude gas and then passing it in an incandescent state through the mass of carbon and alkali.

4. In a process for manufacturing water-gas in which the gas is purified from nitrogen and carbonic oxide by converting the former into ammonia and the latter into carbonic acid, the process of converting the nitrogen into ammonia consisting in, first, raising the crude gas to a state of incandescence wherein its undecomposed steam is decomposed by the carbonic oxide of the gas itself; second, causing the incandescent gas to pass through carbon and alkali and by contact therewith to raise such carbon and alkali to incandescence, its nitrogen combining with them to form alkaline cyanides; third, decomposing the alkaline cyanides so formed by steam, producing ammonia, substantially as described.

5. In a process for manufacturing gas through the decomposition of steam and air by incandescent carbon, and for purifying such gas from nitrogen by converting the latter into cyanogen or alkaline cyanides or cyanates, the process of converting such cyanogen and its gaseous and solid compounds into ammonia, which consists in subjecting the gaseous portion, as it is formed, to the action of steam in a separate chamber, and subjecting the solid compounds to the action of steam in a separate chamber, substantially as described.

6. In an apparatus for the manufacture of gas, the combination of the generator A, superheater F, alkali-furnace J, scrubbers N and S, and furnace R, constructed and operated substantially as described.

7. In an apparatus for the manufacture of gas and ammonia, the furnace J, suitably divided into the chambers L and M, the former provided with a suitable steam-pipe, $d$, and the latter with a water-pipe, $d'$, and suitable induction and eduction pipes for gas, substantially as described.

8. In an apparatus for the manufacture of gas, the superheater F, containing the combustion-chamber G, in combination with the air-superheater H, having its air-inlet $e'$ and its outlet $y$, the latter opening into the combustion-chamber, and the gas-superheater H', suitably provided with a gas-inlet, X, and an outlet or tuyere, $a$, substantially as described.

In testimony whereof I have signed my name to this specification before two subscribing witnesses.

THOS. B. FOGARTY.

Witnesses:
EDWIN F. CURRY,
JOHN B. SIMPSON.